(12) United States Patent
Sakurai et al.

(10) Patent No.: US 6,375,126 B1
(45) Date of Patent: Apr. 23, 2002

(54) VARIABLE CAMBER LEADING EDGE FOR AN AIRFOIL

(75) Inventors: Seiya Sakurai, Seattle; Stephen John Fox, Everett, both of WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 09/714,026

(22) Filed: Nov. 16, 2000

(51) Int. Cl.⁷ ................................................. B64C 3/50
(52) U.S. Cl. ........................................ 244/214; 244/219
(58) Field of Search .............................. 244/214, 210, 244/219, 198

(56) References Cited

U.S. PATENT DOCUMENTS

| | | | |
|---|---|---|---|
| 3,504,870 A | 4/1970 | Cole et al. | 244/214 |
| 3,556,439 A | 1/1971 | Autry | 244/214 |
| 3,743,219 A | 7/1973 | Gorges | 244/214 |
| 3,910,530 A | 10/1975 | James et al. | 244/214 |
| 3,941,334 A | 3/1976 | Cole | 244/214 |
| 3,949,957 A * | 4/1976 | Portier | 244/214 |
| 3,994,451 A | 11/1976 | Cole | 244/214 |
| 4,042,191 A * | 8/1977 | Johnson | 244/214 |
| 4,159,089 A * | 6/1979 | Cole | 244/214 |
| 4,189,120 A | 2/1980 | Wang | 244/214 |
| 4,189,121 A | 2/1980 | Harper et al. | 244/214 |
| 4,262,868 A | 4/1981 | Dean | 244/214 |
| 4,351,502 A | 9/1982 | Statkus | 244/219 |
| 4,445,655 A * | 5/1984 | Hueberger | 244/214 |
| 5,158,252 A | 10/1992 | Sakurai | 244/214 |

* cited by examiner

*Primary Examiner*—J. Woodrow Eldred
(74) *Attorney, Agent, or Firm*—Harness Dickey & Pierce P.L.C.

(57) ABSTRACT

A leading edge assembly for an airfoil. The assembly includes a Variable Camber Kreuger (VCK) panel which is hingedly attached at a forward end to a bullnose. Forward and aft suspension links serve to suspend the leading edge assembly within a recessed area in a lower surface of an airfoil in a cruise position. A linkage assembly operably associated with the forward and aft suspension links causes the VCK panel to be rotated from its cruise position into a take-off or a landing position in a manner which prevents scooping of air into the recessed area of the airfoil during this extending movement. A forwardmost edge of the panel overlaps a portion of the bullnose, to thus eliminate the need for a seal at this interface when the assembly is in the landing or the take-off positions. When in the take-off position, a trailing edge of the VCK panel overlaps an upper, forward edge of the airfoil to eliminate the need for a seal at this interface. When in the take-off position, the linkage elements supporting the assembly form a rigid, strong, truss-type load structure, thus requiring a lesser degree of torque to be imparted by an actuator associated with the airfoil to hold the leading edge assembly in the take-off position during take-off.

13 Claims, 5 Drawing Sheets

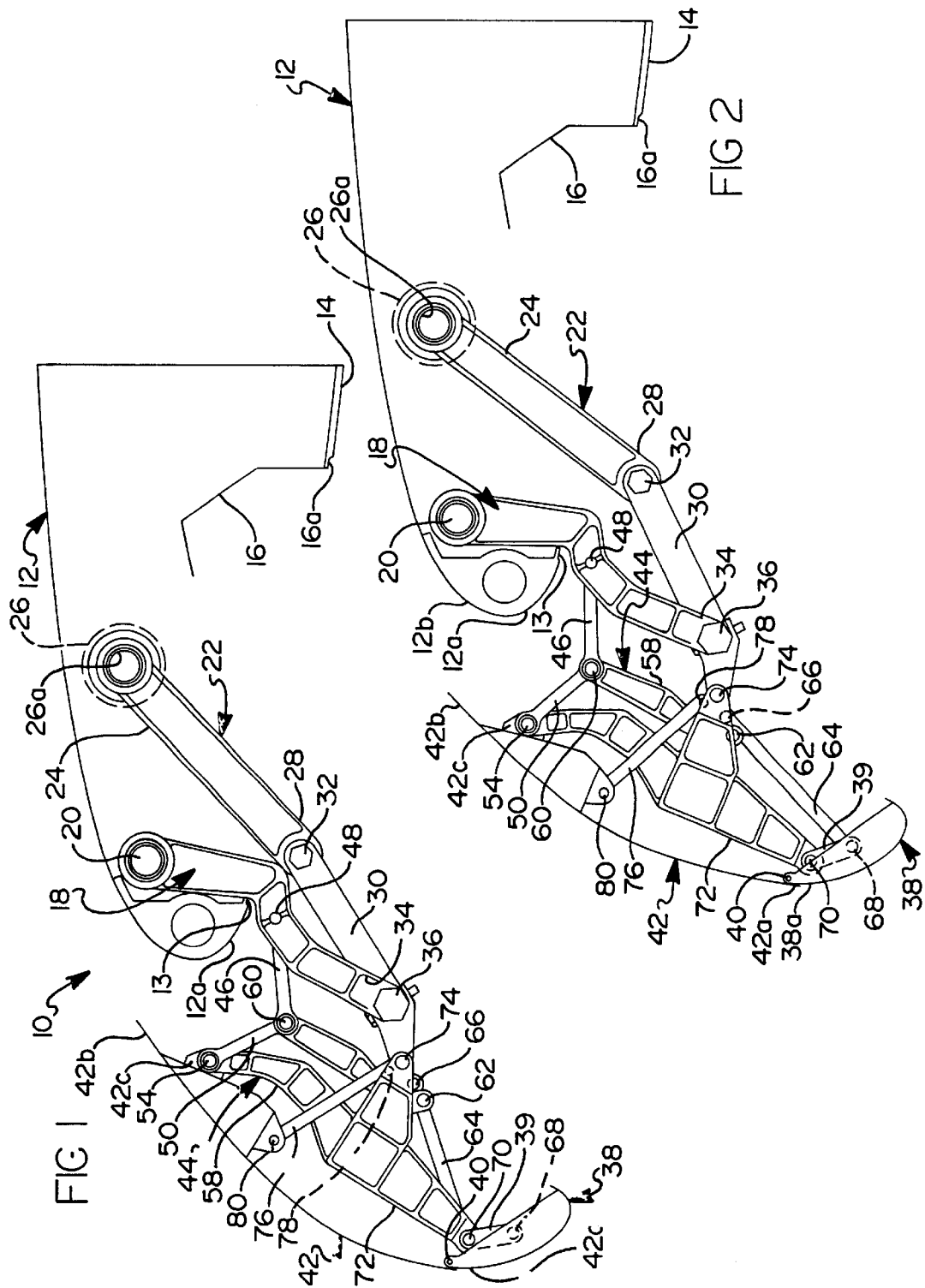

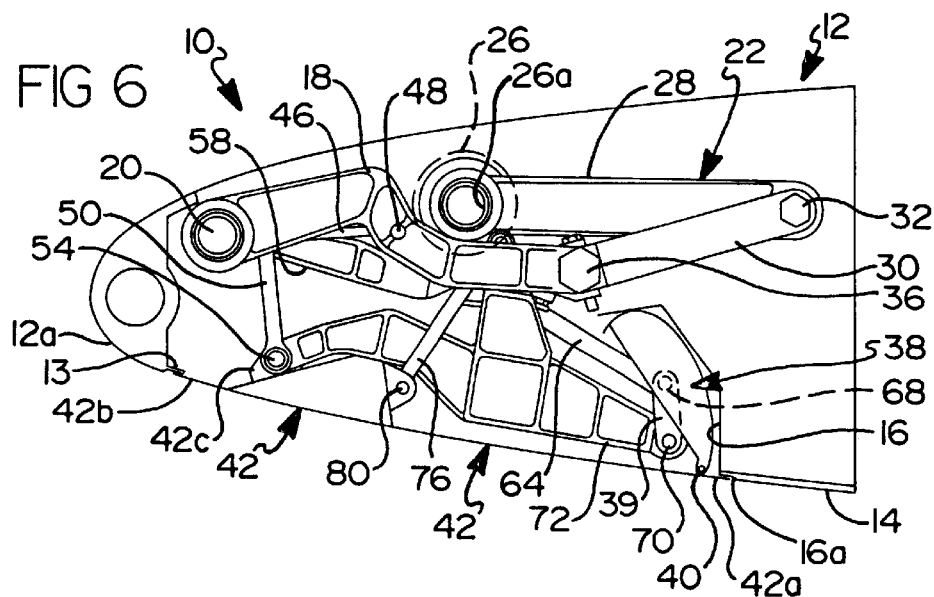
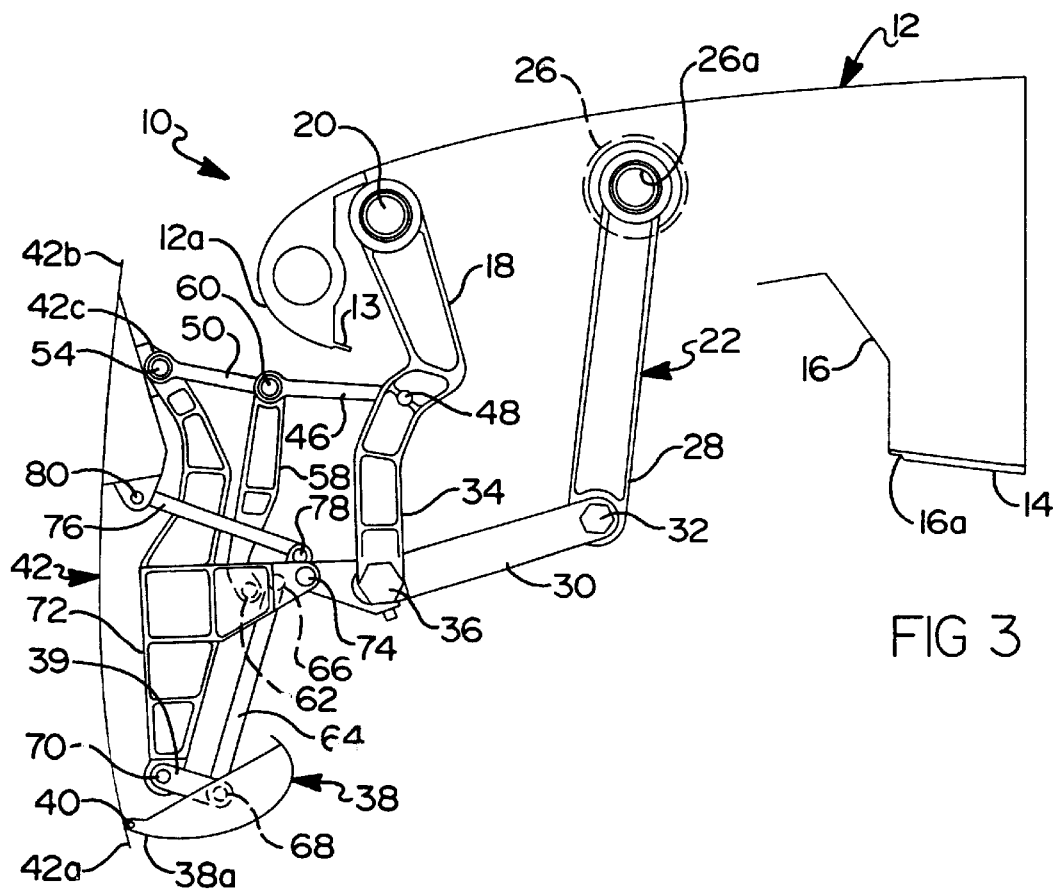

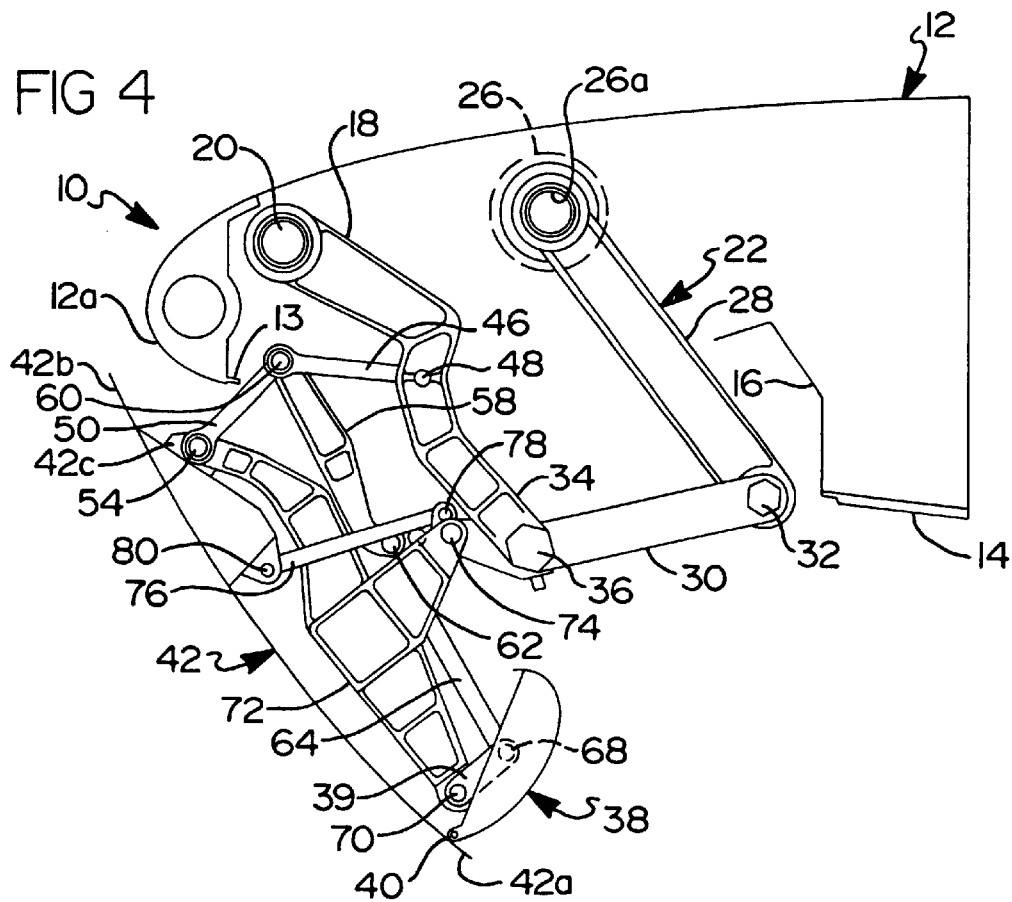
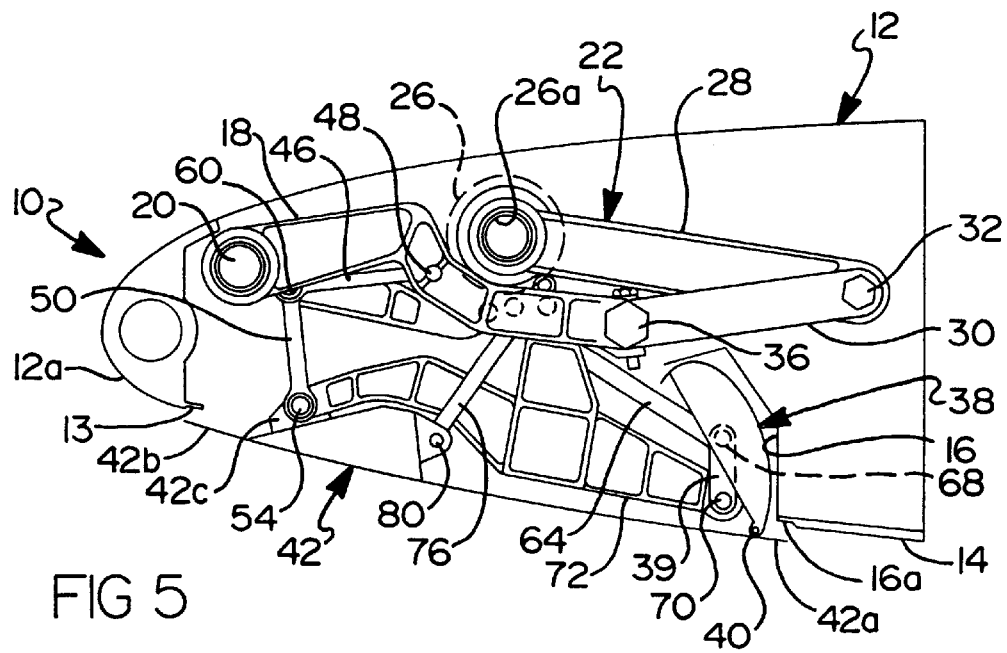

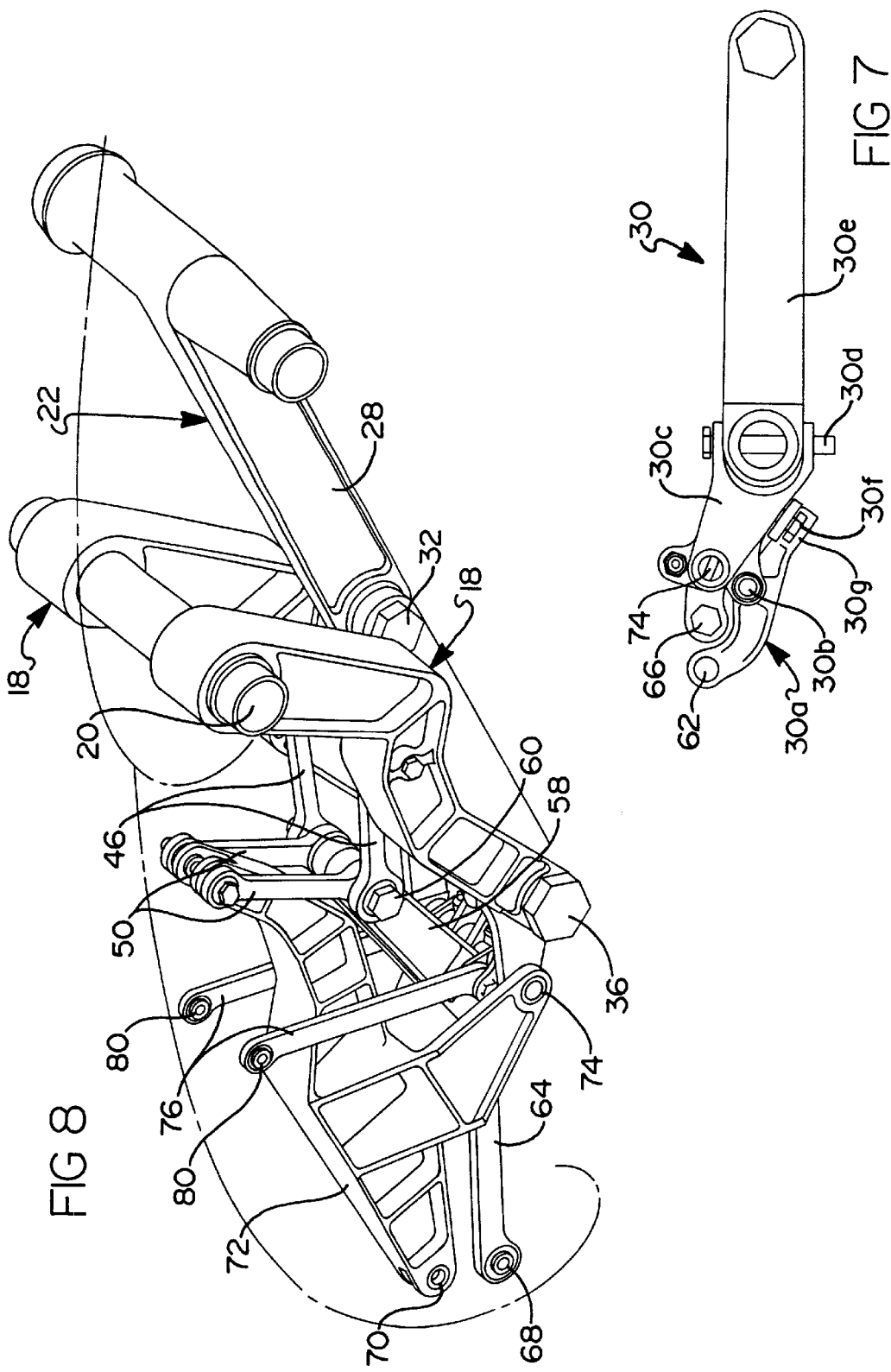

VARIABLE CAMBER LEADING EDGE FOR AN AIRFOIL

TECHNICAL FIELD

This invention relates to airfoil structures for fixed wing aircraft, and more particularly to a leading edge construction for an airfoil.

BACKGROUND OF THE INVENTION

Present day state of the art commercial twin-engined aircraft use leading edge slats for controlling airflow over the fixed wings of the aircraft during takeoff, landing and cruise conditions. However, slats are heavy, expensive, cannot use common parts, and must use the high-speed (i.e., cruise) wingfoil shape in the extended, angled positions at takeoff and landing. Current production Variable Camber Kreuger (VCK) devices are two-position devices (cruise and gapped), which have excessive drag for takeoff. The VCK advantage is a more optimum aerodynamic shape. One specific area of leading edge flap design where even further improvement is desired is in the seal between the panel of the leading edge component and the airfoil, and also between the panel and bullnose of the leading edge component. Often it has been difficult to achieve an excellent seal between the panel/wing and panel/bullnose interface without the use of separate seal elements. An excellent seal formed at these areas, directly between the forward and rearward portions of the panel and the airfoil, would even further enhance the aerodynamic efficiency of the variable camber leading edge when the leading edge flap is in its takeoff and landing positions.

Still another area where even further improvement would be desirable is in the manner in which the variable camber leading edge flap is deployed from a retracted (i.e., cruise) position into either a takeoff or a landing position. Some designs of variable camber leading edge constructions, when initially moved out of their retracted positions, tend to "scoop" air using the undersurface of the panel forming the variable camber leading edge assembly. It would be desirable to provide a leading edge construction which does not operate to scoop air when it is initially deployed from its retracted (i.e., cruise) position into either a takeoff or a landing position.

SUMMARY OF THE INVENTION

The present invention relates to a Variable Camber Kreuger leading edge assembly for an airfoil of an aircraft. The leading edge assembly includes a variable camber panel which is hingedly secured to a bullnose. The panel/bullnose assembly is suspended from a lower surface of the airfoil by a forward suspension link and an aft suspension link operatively associated with a linkage assembly. The linkage assembly includes connections to the panel at three points along the panel. The linkage assembly is also coupled to the bullnose to cause the bullnose to be folded toward the panel when the leading edge assembly is in a cruise position.

In the cruise position the bullnose is folded toward the panel, and the panel forms a generally smooth, continuous lower surface of the airfoil. As the aft suspension link is driven rotationally by a torque shaft of an actuator, the panel rotates outwardly from the lower area of the airfoil such that a leading edge of the panel moves at a greater rate of travel than the trailing edge of the panel. During this portion of movement the bullnose also begins to unfold. The trailing edge of the panel is maintained close to a forwardmost leading edge of the airfoil to thus prevent the leading edge assembly from "scooping" air during this portion of movement.

The forward and aft suspension links, together with the linkage assembly, continue to urge the panel/bullnose rotationally, with the bullnose continuing to unfold, until the panel/bullnose is in a landing position. In this position a gap exists between the trailing edge of the panel and the forwardmost leading edge of the airfoil. The bullnose is also rotated during this portion of movement so that it forms a generally smooth, continuous curvature with the panel when the panel reaches the landing position.

When the aft suspension link is rotated further it causes the linkage assembly to urge the panel/bullnose into a "take-off" position. In the take-off position the trailing edge of the panel abuts the forwardmost leading edge of the airfoil to form a smooth seal therebetween. A forwardmost edge of the panel also rests over a trailing edge of the bullnose to also form a smooth seal at this interface. When in the take-off position, the aft suspension link and linkage assembly form an especially strong truss-type load path to provide a highly rigid arrangement that is not susceptible to deflection in response to the high loads experienced during takeoff. The sealing action provided by the leading and trailing edges of the panel eliminate the need for separate seals at the panel/bullnose interface and the panel/airfoil interface, thus also serving to reduce the cost of the leading edge assembly.

BRIEF DESCRIPTION OF THE DRAWINGS

The various advantages of the present invention will become apparent to one skilled in the art by reading the following specification and subjoined claims and by referencing the following drawings in which:

FIG. 1 is a side view of a Variable Camber Kreuger leading edge assembly for an airfoil, in accordance with a preferred embodiment of the present invention, with the leading edge assembly shown in a take-off position;

FIG. 2 is a side view of the leading edge assembly of FIG. 1 with the assembly shown in a landing position;

FIG. 3 is a side view of the leading edge assembly of FIG. 1 shown in a transition position inbetween the landing and cruise positions;

FIG. 4 is a view of the leading edge assembly of FIG. 1 also in a transition position between the cruise and landing positions;

FIG. 5 is a view of the leading edge assembly of FIG. 1 in a transition position after just moving out of the cruise position;

FIG. 6 is a side view of the leading edge assembly of FIG. 1 in the cruise position retracted within a lower surface of an airfoil;

FIG. 7 is a side view of just the lower link;

FIG. 8 is a top perspective view of the leading edge assembly in the take-off position, with the panel and bullnose omitted for clarity.

DETAILED DESCRIPTION OF THE PREFERRED EMBODIMENTS

Figure 9:
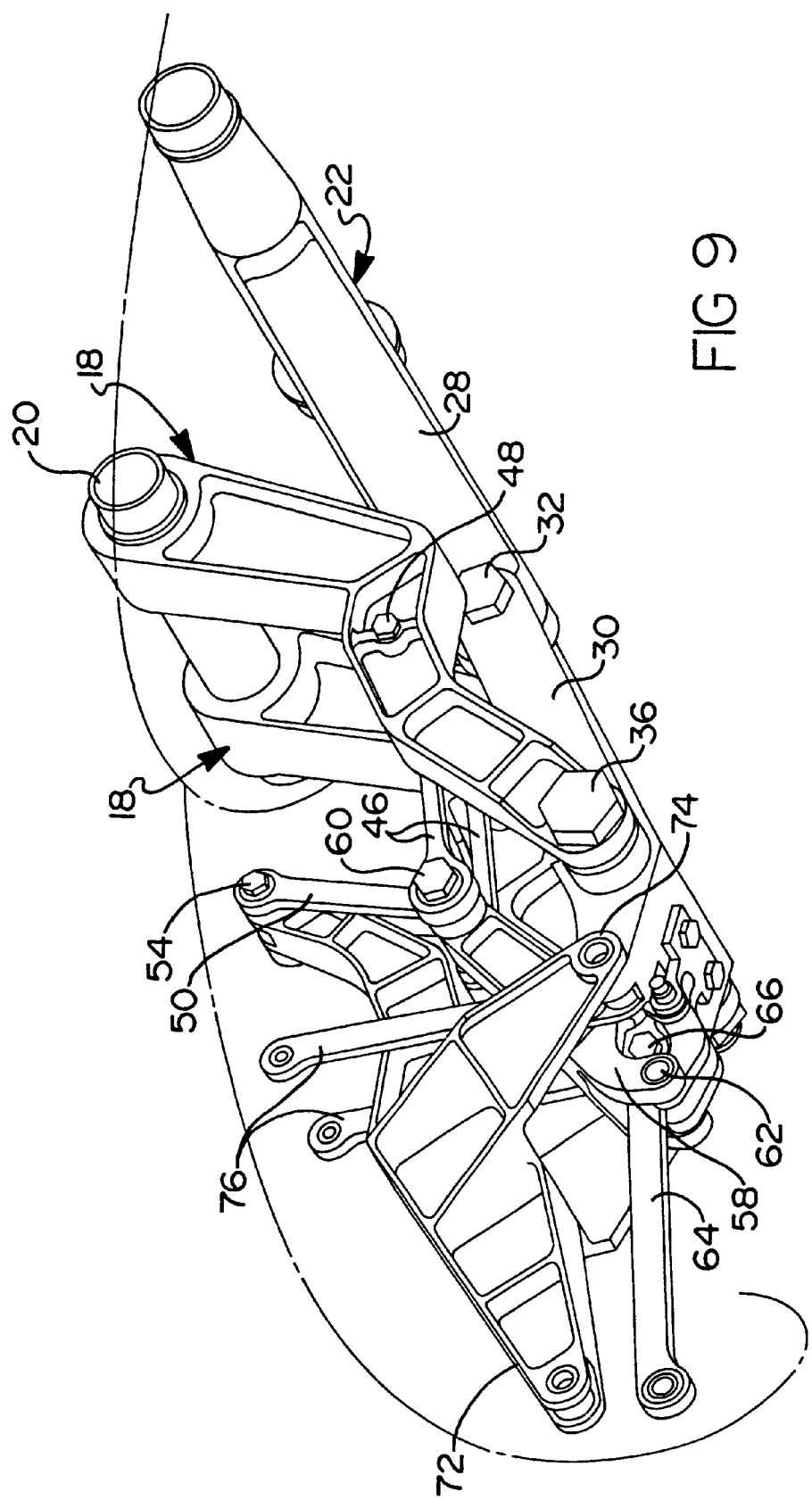
FIG. 9 is a bottom perspective view of the leading edge assembly of FIG. 7.

Referring to FIGS. 1–6, there is shown a Variable Camber Kreuger (VCK) leading edge assembly 10 in accordance with a preferred embodiment of the present invention for use with an airfoil 12 of a fixed wing aircraft. Initially, it will be understood that the airfoil 12 includes a lower surface 14 having a recess 16 of sufficient area to accommodate the leading edge assembly 10 when the assembly is in a retracted or "cruise" position.

Referring specifically to FIGS. 1 and 2, the leading edge assembly 10 is suspended from the airfoil 12 by a forward suspension link 18 pivotably coupled at point 20 to the airfoil 12, and an aft suspension link 22 drivingly coupled at upper end 24 to a torque shaft 26a of an actuator 26. The aft suspension link 22 is comprised of an upper link 28 and a lower link 30 pivotably coupled at point 32. A lower end 34 of the forward suspension link 18 is pivotably coupled at point 36 with a portion of the lower link 30.

The leading edge assembly 10 also comprises a bullnose 38 which is hingedly attached via a hinge at point 40 to a variable camber panel 42. The panel 42 has a leading, forwardmost edge 42a and a trailing edge 42b. Forwardmost edge 42a abuts against edge 16s to form a seal when the variable camber panel 42 is in the fully retraced position. Similarly, trailing edge 42b abuts edge 13 to form a seal when the panel 42 is in the retracted position. This sealing at the forward and rear portions of the panel 42 is thus accomplished without independent seal members.

With further reference to FIGS. 1 and 2, a scissors linkage assembly 44 includes a first link 46 pivotably coupled to an intermediate point of the forward suspension link 18 at point 48, a second link 50 pivotably coupled at pivot point 54 to a mounting structure 42c of the panel 42. A third scissors link 58 is pivotably coupled at point 60 to opposite ends of each of scissors links 50 and 44, and at an opposite end thereof at pivot point 62 to a portion of the lower link 30. A first extension link 64 is also pivotably coupled at a point 66 to the lower link 30 and at an opposite end thereof at point 68 to the bullnose 38.

Link 50 is preferably a two piece link threadably coupled to allow adjustment of its overall length. This degree of adjustability allows a degree of preload to be achieved between surface 12a and trailing edge 42b when the panel 42 is in its cruise position.

The bullnose 38 is also coupled via a short link 39 to pivot point 70, which is in turn coupled to a second extension link 72. An opposite end of the second extension link 72 is coupled to the mounting structure 42c at pivot point 54. An intermediate point of the second extension link 72 is also pivotably coupled at point 74 to the lower link 30. Finally, a support link 76 is operatively pivotably coupled at pivot point 78 to the lower link 30 and at its opposite end to the mounting structure 42c via pivot point 80. Accordingly, it will be appreciated that the entire panel 42, bullnose 38 and linkage assembly comprising scissors linkage assembly 44, support link 76, and the first and second extension links 64 and 72, respectively, are all suspended by the forward suspension link 18 and the aft suspension link 28.

The approximate forwardmost half of the panel 42 (i.e., approximately between pivot points 40 and 80) comprises the variable camber portion of the panel 42. The approximate rear half of the panel 42 (i.e., the portion approximately between pivot points 80 and 54) represents the rigid portion of the panel 42.

With brief reference to FIG. 7, the lower link 30 is shown in greater detail. This link 30 is formed with an extending link 30a pivotally mounted at point 30b to a yoke assembly 30c. The yoke assembly 30c is in turn secured by a bolt 30d to an aft link member 30e. A threaded bolt 30f extends through an opening in a flange 30g of the extending link 30a. By using washers or shims, in connection with bolt 30f, the position of pivot point 62 can be adjusted to also help control the degree of preload applied through scissors link 58 between the surface 12a and aft edge 42b of the panel 42.

The operation of the leading edge assembly 10 will now be described. With initial reference to FIG. 6, the leading edge assembly 10 is shown in the retracted or "cruise" position. In this position the airfoil 12 forms a highly aerodynamic shape suitable for high speed flight and panel 42 has a first degree of curvature. The bullnose 38 is folded within the recess 16 and panel 42 forms a smooth, integral portion of the lower surface 14 of the airfoil 12.

Referring now to FIG. 5, when the leading edge assembly 10 is to be urged to either a "take-off" or "landing" position, the torque shaft 26a of the actuator 26 is rotated which causes the upper link 28 of the aft suspension link 22 to be rotated clockwise in the drawing of FIG. 5. This clockwise rotation causes the panel 42 to be rotated more rapidly at the leading edge 42a than at the trailing edge 42b. The trailing edge 42b also remains relatively close to the bottom, forwardmost edge 12a of the airfoil 12 to thus inhibit airflow into the recess 16 of the airfoil 12.

Referring to FIG. 4, further clockwise rotation of the upper link 22 by the actuator 26 causes the lower link 30 to descend, which also causes the forward suspension link 18 to rotate clockwise. The first extension link 64 also causes clockwise rotational movement of the bullnose 38 about pivot point 40.

Referring to FIG. 3, further clockwise rotation of the upper link 28 causes the first extension link 64 to continue rotating the bullnose 38 about pivot point 68. The scissors linkage assembly 44 also operates to begin bending the panel 42 via a pulling action by the third link 58 as the lower link 30 extends further forwardly of the airfoil 12.

Referring to FIG. 2, still further clockwise movement of the upper link 28 causes the first extension link 64 to urge the bullnose 38 rotationally into its fully extended (i.e., landing) position. In this position, a trailing edge 38a of the bullnose 38 is disposed slightly underneath the leading edge 42a of the panel 42 to provide a smooth, aerodynamic seal therebetween. The third link 58 of the scissors linkage assembly 44 also causes a slight additional degree of curving of the panel 42 such that the panel 42 forms a desired aerodynamic curvature, or second degree of curvature, during landing operations. In this position a "gap" is present between the trailing edge 42b of the panel 42 and an upper, forwardmost edge 12b of the airfoil 12.

An important advantage of the present invention is that the panel 42 is moved from the positions of FIGS. 3 and 4 into the position shown in FIG. 2 without presenting the panel 42 in a position where it operates to scoop air into the recess 16. In this manner the aerodynamic efficiency of the airfoil 12 during deployment is improved significantly.

Referring now to FIG. 1, further clockwise rotation of the upper link 28 causes the trailing edge 42b of the panel 42 to abut the upper, forwardmost edge 12b of the airfoil 12 to form a relatively smooth, aerodynamic seal therebetween. Advantageously, this seal is formed without any separate sealing member or component being required at this interface. The leading edge assembly 10 is also shown in the take-off position in FIGS. 8 and 9, with the bullnose 38 and panel 42 omitted for clarity. In these views it can be seen that a pair of j-links 76, a pair of second links 50, a pair of first links 46, and a pair of forward suspension links 18 are employed to form the leading edge mechanism 10.

Another advantage of the present invention is that the scissors linkage assembly 44 allows very good control of the position, angle and shape of the panel 42 of the assembly 10. The scissors assembly 44 also provides for quick auto-gapping of the leading edge assembly 10 if stall is imminent.

When the leading edge assembly 10 is in the take-off position shown in FIG. 1, the upper link 28, lower link 30 and first extension link 64 form a relatively straight, truss-type load path. As a result, a lesser degree of torque is required to hold the assembly 10 in this position than with many previously developed leading edge constructions. This also provides an extremely structurally rigid arrangement.

Another advantage of the leading edge assembly 10 of the present invention is that if the assembly 10 is overloaded when in the landing or take-off positions, the assembly 10 will collapse, thus avoiding damage to surrounding structure of the airfoil 12. This also ensures that the leading edge assembly 10 remains attached to the airfoil 12 in the event that unusually high aerodynamic forces are experienced which cause overloading of the leading edge assembly 10.

Still further, the overlapping of the forwardmost leading edge 42a of the panel 42 over the bullnose 38 when the assembly 10 is urged into the landing or take-off positions eliminates the need for separate seals to be used at the panel/bullnose interface for landing and take-off, as well as eliminating the need for separate seals at the panel/airfoil interface when in the take-off position. This also serves to reduce weight, the number of parts required for the assembly 10, and thus the cost and complexity of the assembly.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A variable camber leading edge assembly for an airfoil, comprising:

A forward suspension link pivotably coupled at a first end to a portion of said airfoil;

an aft suspension link coupled at a first end to a portion of said airfoil aft of said first end of said forward suspension link;

a bullnose;

a variable camber panel hingedly coupled at a first end to said bullnose;

a linkage assembly operably supporting said bullnose and said variable camber panel from said forward and aft suspension links;

wherein said bullnose and said variable camber panel are urged rotationally from a cruise position, wherein said bullnose and said variable camber panel are retracted within a lower area of said airfoil to form a lower surface of said airfoil, to a landing position, wherein said variable camber panel and said bullnose are rotated to extend forwardly of said airfoil without causing a scooping of air into said lower area and to form a gap between said variable camber panel and a forwardmost upper edge surface of said airfoil;

wherein said bullnose and variable camber panel are moveable rotationally from said cruise position to a take-off position without scooping air into said lower area of said airfoil, and wherein said variable camber panel forms a smooth, gapless engagement with said forwardmost upper edge surface of said airfoil; and and wherein said linkage assembly operates to alter a curvature of said variable camber panel when said leading edge assembly is moved between said cruise and said takeoff and landing positions.

2. The leading edge assembly of claim 1, wherein said linkage assembly comprises a scissors linkage assembly operatively coupled to said variable camber panel, to said aft suspension link and to said forward suspension link.

3. The leading edge assembly of claim 2, wherein said scissors linkage assembly comprises first, second and third scissors links pivotably coupled to one another at a common pivot point.

4. The leading edge assembly of claim 1, wherein in said cruise position said variable camber panel forms seals at a trailing edge and at a leading edge with respect to said airfoil.

5. The leading edge assembly of claim 1, wherein said linkage assembly comprises first and second extension links, each of said extension links being coupled at one end thereof to portions of said bullnose and at opposite ends thereof to said variable camber panel and said aft suspension link.

6. A variable camber leading edge assembly for an airfoil, comprising:

a forward suspension link pivotably coupled at a first end to a portion of said airfoil;

an aft suspension link coupled at a first end to a portion of said airfoil aft of said first end of said forward suspension link;

a bullnose;

a variable camber panel hingedly coupled at a first end to said bullnose;

a first extension link coupled at a first end to said bullnose and at a second end to said aft suspension link;

a support link fixedly secured adjacent a trailing edge of said variable camber panel;

a second extension link coupled at a first end to said bullnose and at a second end to said support link, and at an intermediate point to said aft suspension link;

a scissors linkage assembly having:

a first scissors link pivotably coupled at a first point to an intermediate point of said forward suspension link;

a second scissors link pivotably coupled at a first point to said support link;

and a third scissors link pivotably coupled at a first end to second ends of each of said first and second scissors links, and at a second end thereof pivotably to a second end of said aft suspension link;

wherein said bullnose and said variable camber panel are movable by rotational movement of said aft support link from a cruise position retracted within a lower surface of said airfoil to a landing position, wherein in said landing position said second end of said variable camber panel is spaced apart from a leading edge of said airfoil to form a gap therebetween, and when in said cruise position said variable camber panel forms a first arc;

wherein said variable camber panel is moveable from said cruise position to a takeoff position extending forwardly of said airfoil, wherein said scissors linkage operates to flex said variable camber panel to form a second arc and wherein said second end of said variable camber panel engages flush with said leading edge of said airfoil to form a smooth, aerodynamic transition therebetween; and wherein retracting movement of said variable camber panel from said takeoff position to said cruise position is accomplished by rotating said variable camber panel and said bullnose attached thereto about a lower end of said forward main support link such that said variable camber panel and said bullnose do not operate to scoop air into a lower area of said airfoil when moving from said takeoff position to said cruise position.

7. The leading edge assembly of claim 6, wherein said aft support link comprises an upper link and a lower link pivotably coupled to one another.

8. The leading edge assembly of claim 6, wherein said first extension link causes said bullnose to be folded toward said variable camber panel as said leading edge assembly is retracted into said lower area of said airfoil when moving into said cruise position.

9. The leading edge assembly of claim 6, wherein in said takeoff position, said aft support link and said first extension link form a generally straight length to provide a truss-type load path.

10. The leading edge assembly of claim 6, wherein said second arc is greater than said first arc.

11. A variable camber leading edge assembly for an airfoil, comprising:
   an aft suspension link assembly having an upper link and a lower link pivotably coupled together, wherein said upper link thereof is pivotably coupled at a first end thereof to a portion of said airfoil;
   a forward suspension link pivotably coupled at a first end to a portion of said airfoil forward of said first end of said aft suspension link;
   an actuator having a torque shaft operably coupled to said first end of said upper link of said aft suspension link;
   a bullnose;
   a variable camber panel hingedly coupled at a first end to said bullnose;
   a first extension link coupled at a first end to said bullnose and at a second end to said lower link of said aft suspension link;
   a second extension link coupled at a first end to said bullnose and operatively coupled at a second end thereof to a second end of said variable camber panel, and at an intermediate point to said lower link of said aft suspension link;
   a scissors linkage assembly having:
      a first scissors link pivotably coupled at a first point to an intermediate point of said forward suspension link;
      a second scissors link pivotably coupled at a first point to said second end of said variable camber panel;
      and a third scissors link pivotably coupled at a first end to second ends of each of said first and second scissors links, and at a second end thereof pivotably to said second end of said aft suspension link; and
   wherein said bullnose and said variable camber panel are movable by rotational movement of said aft support link by said actuator from a cruise position, wherein said variable camber panel assumes a first arc, from within a lower surface of said airfoil to a landing position, wherein in said landing position said second end of said variable camber panel is spaced apart from a leading edge of said airfoil to form a gap therebetween, and said variable camber panel forms a second arc;
   wherein said variable camber panel is moveable from said cruise position to a takeoff position extending forwardly of said airfoil, wherein said scissors linkage assembly operates to flex said variable camber panel to form said second arc and wherein said second end of said variable camber panel engages flush with said leading edge of said airfoil to form a smooth, aerodynamic transition therebetween, and wherein said second arc is greater than said first arc; and
   wherein retracting movement of said variable camber panel from said takeoff position to said cruise position is accomplished by rotating said variable camber panel and said bullnose attached thereto about a lower end of said forward main support link such that said variable camber panel and said bullnose do not operate to scoop air into a lower area of said airfoil when moving from said takeoff position to said cruise position.

12. A method of controlling a variable camber panel disposed within a lower area of an airfoil when the panel is in a cruise position such that said panel is extended forwardly of said airfoil into a landing position in a manner to avoid scooping air during movement between said cruise and landing positions, said method comprising the steps of:
   suspending said variable camber panel from within a recess point disposed within said airfoil by a linkage assembly;
   using said linkage assembly to cause a forward edge of said variable camber panel to being rotating at a greater rate of travel than a trailing edge of said panel when said panel is moved initially out of said cruise position;
   using said linkage assembly to continue rotating said variable camber panel while also moving said panel forwardly of said airfoil such that said trailing edge is maintained close to a leading edge surface of said airfoil as said panel is moved to and beyond an intermediate position between said cruise and landing positions; and
   continuing to rotate said variable camber panel beyond said intermediate position to said landing position, wherein said panel forms a relatively continuously curving forward section of said airfoil.

13. The method of claim 12, further comprising the step of:
   continuing to rotate said variable camber panel from said landing position to a takeoff position, wherein said trailing edge of said panel abuts said leading edge surface of said airfoil to form a gapless, continuously curving extension of said airfoil.

* * * * *